(12) United States Patent
Watanabe et al.

(10) Patent No.: US 12,322,550 B2
(45) Date of Patent: Jun. 3, 2025

(54) ELECTRONIC COMPONENT

(71) Applicant: TDK CORPORATION, Tokyo (JP)

(72) Inventors: Atsushi Watanabe, Tokyo (JP);
Yasuhiro Okui, Tokyo (JP); Yoshitaka Nagashima, Tokyo (JP); Shinya Saito, Tokyo (JP); Yasuo Watanabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 145 days.

(21) Appl. No.: 18/468,502

(22) Filed: Sep. 15, 2023

(65) Prior Publication Data

US 2024/0112863 A1   Apr. 4, 2024

(30) Foreign Application Priority Data

Sep. 30, 2022 (JP) ................... 2022-158416

(51) Int. Cl.
  *H01G 4/012* (2006.01)
  *H01G 4/232* (2006.01)
  *H01G 4/30* (2006.01)
(52) U.S. Cl.
  CPC ........... *H01G 4/012* (2013.01); *H01G 4/2325* (2013.01); *H01G 4/30* (2013.01)
(58) Field of Classification Search
  CPC ........ H01G 4/012; H01G 4/2325; H01G 4/30; H01G 4/0085; H01G 4/232; H01G 4/38; H01G 4/005
  See application file for complete search history.

(56) References Cited

U.S. PATENT DOCUMENTS

| 8,056,199 | B2 * | 11/2011 | Aoki | H01G 4/232 |
| | | | | 29/25.03 |
| 2003/0007310 | A1 * | 1/2003 | Trinh | H01G 4/35 |
| | | | | 361/302 |
| 2007/0109717 | A1 * | 5/2007 | Lee | H01G 4/012 |
| | | | | 361/303 |
| 2009/0168296 | A1 * | 7/2009 | Togashi | H01G 4/228 |
| | | | | 361/306.3 |

(Continued)

FOREIGN PATENT DOCUMENTS

| JP | 2008193055 A | * | 8/2008 | ............. H01G 2/065 |
| JP | 2017108057 A | * | 6/2017 | ............. H01G 4/012 |

(Continued)

*Primary Examiner* — Dion R. Ferguson
(74) *Attorney, Agent, or Firm* — Oliff PLC

(57) ABSTRACT

An electronic component includes: a first internal electrode provided in an element body; a second internal electrode provided in the element body; a third internal electrode provided in the element body and drawn out to a first side surface; and a fourth internal electrode provided in the element body and drawn out to a second side surface. The third internal electrode and the fourth internal electrode are electrically connected to each other through an external connection conductor formed on at least the first side surface and the second side surface. In a first direction, the first internal electrode faces the third internal electrode without facing the second internal electrode and the fourth internal electrode. In the first direction, the second internal electrode faces the fourth internal electrode without facing the first internal electrode and the third internal electrode.

8 Claims, 10 Drawing Sheets

(56) References Cited

U.S. PATENT DOCUMENTS

| | | | |
|---|---|---|---|
| 2010/0033896 A1* | 2/2010 | Togashi | H01G 4/385 |
| | | | 361/328 |
| 2015/0109718 A1* | 4/2015 | Choi | H01G 4/30 |
| | | | 174/258 |
| 2017/0316882 A1* | 11/2017 | Park | H01G 4/012 |
| 2017/0367188 A1* | 12/2017 | Park | H01G 4/12 |
| 2018/0226191 A1* | 8/2018 | Yoshida | H01G 4/232 |
| 2019/0189344 A1 | 6/2019 | Yoshida et al. | |
| 2021/0202172 A1* | 7/2021 | Kanzaki | H01G 4/30 |
| 2021/0327648 A1* | 10/2021 | Kanzaki | H01G 4/0085 |
| 2022/0165499 A1* | 5/2022 | Kim | H01G 4/232 |
| 2022/0216011 A1* | 7/2022 | Berolini | H01G 4/005 |
| 2024/0112863 A1* | 4/2024 | Watanabe | H01G 4/232 |

FOREIGN PATENT DOCUMENTS

| | | | | |
|---|---|---|---|---|
| JP | 2019-046876 A | | 3/2019 | |
| JP | 6981438 B2 * | | 12/2021 | H01G 2/02 |
| KR | 20090117686 A * | | 11/2009 | |
| KR | 101026646 B1 * | | 4/2011 | |
| WO | WO-2024247369 A1 * | | 12/2024 | |

\* cited by examiner

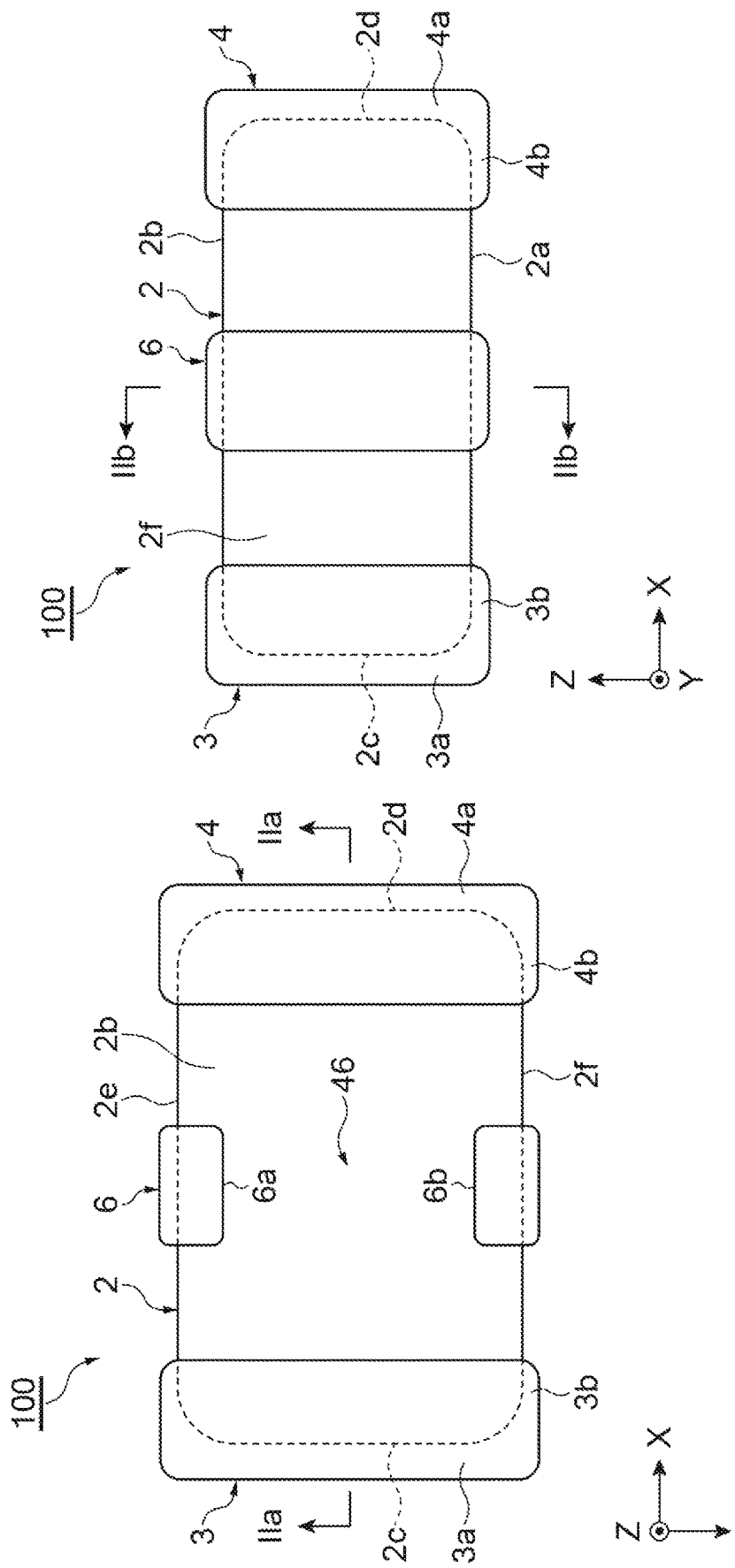

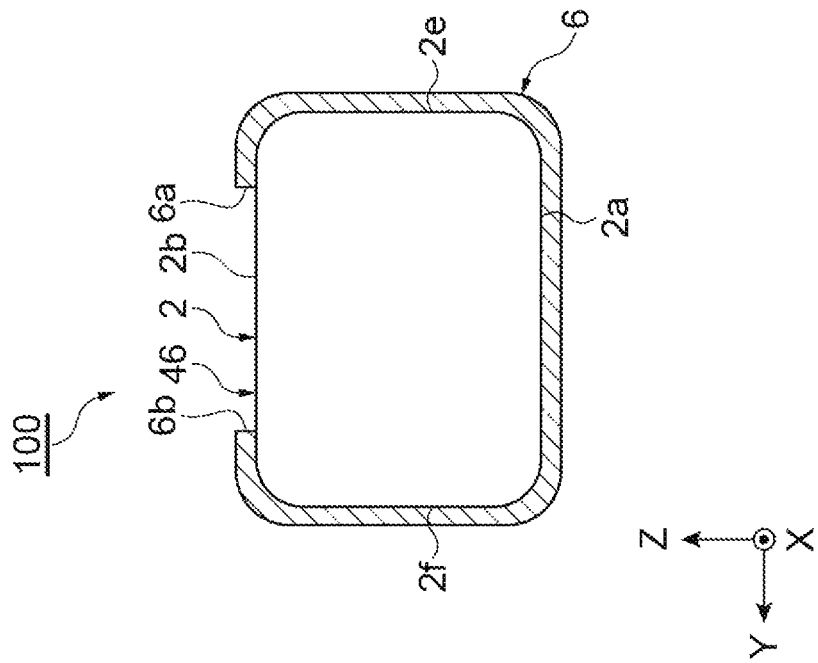
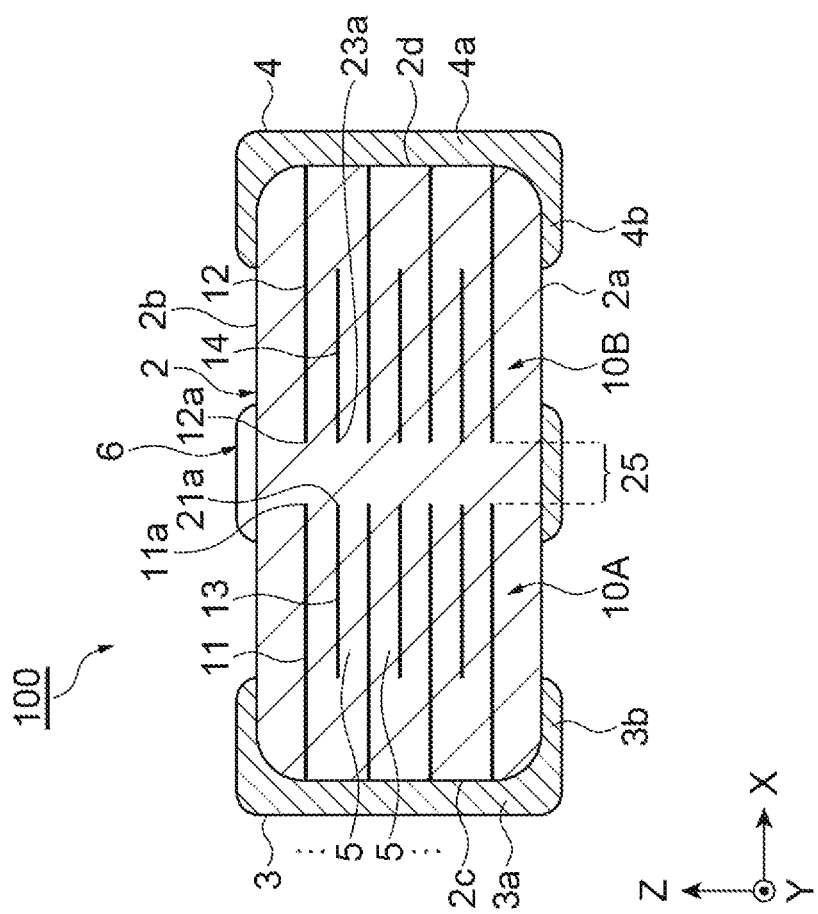

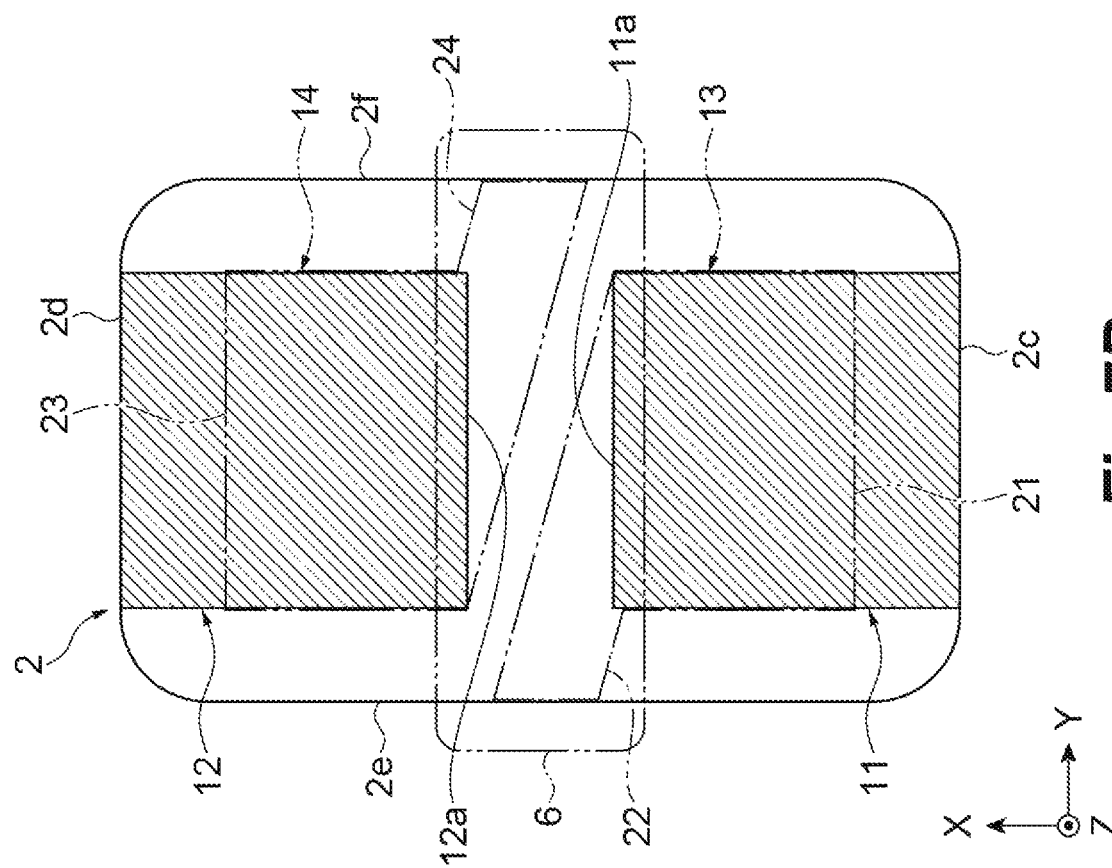
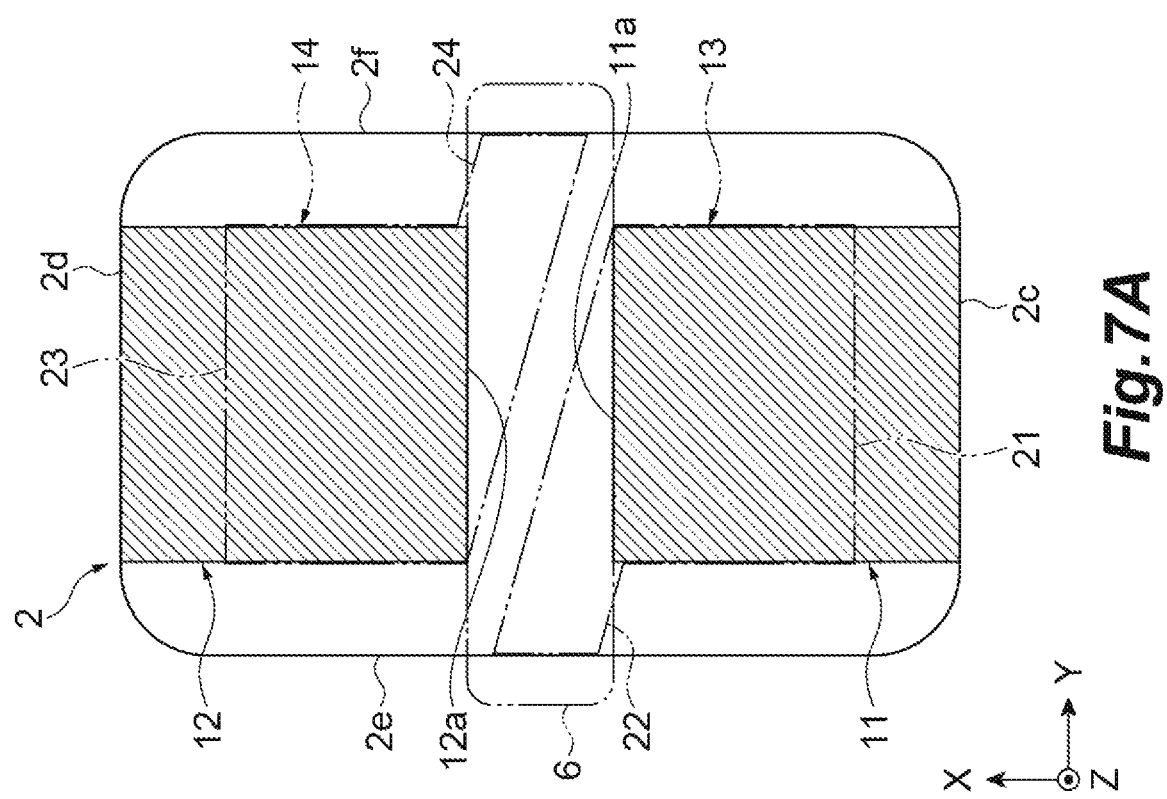

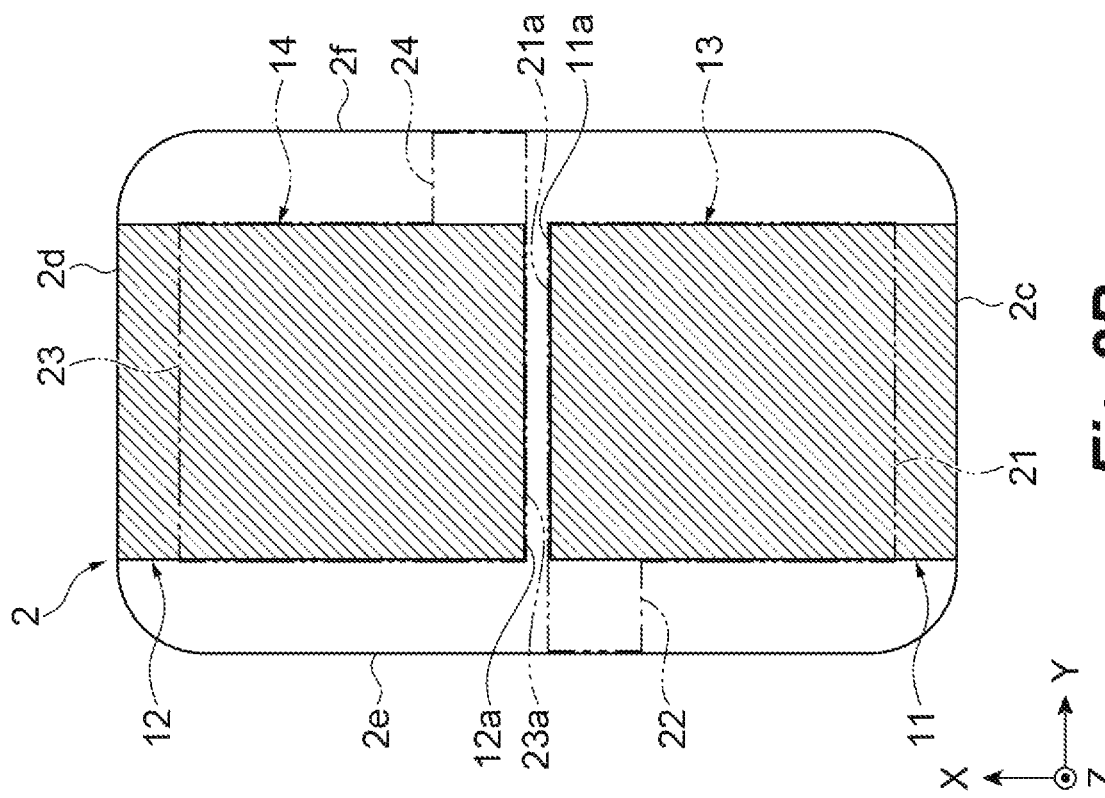
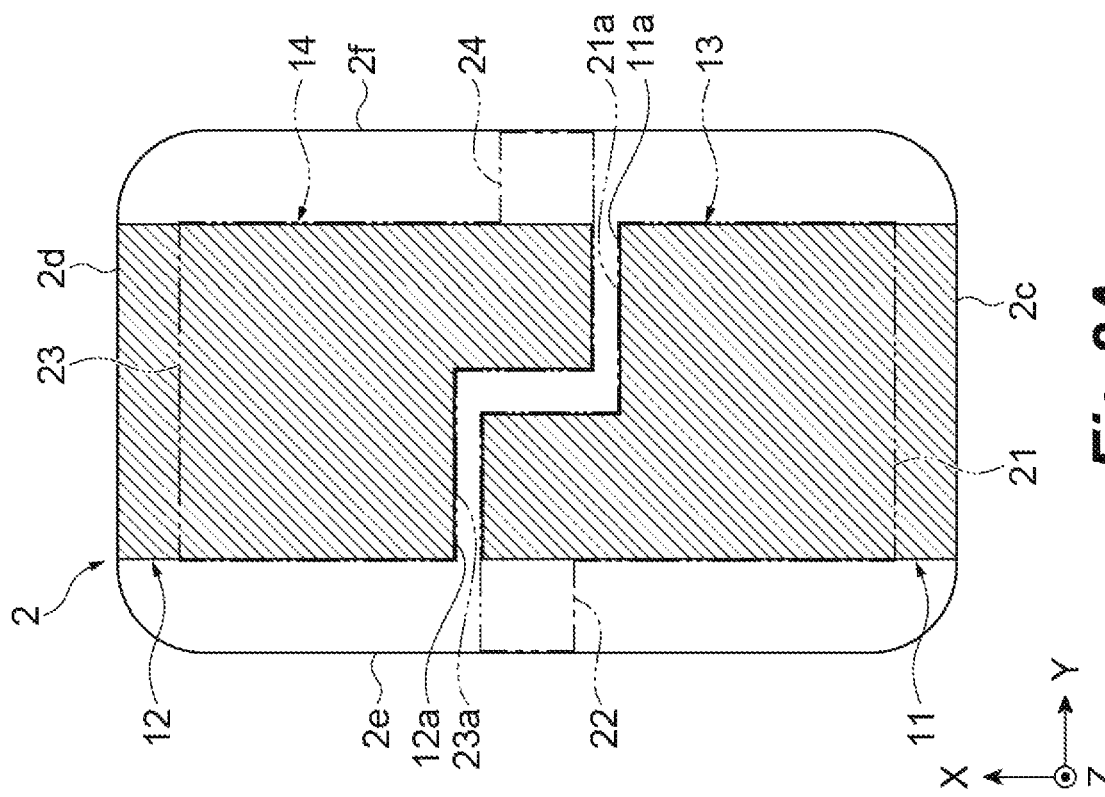

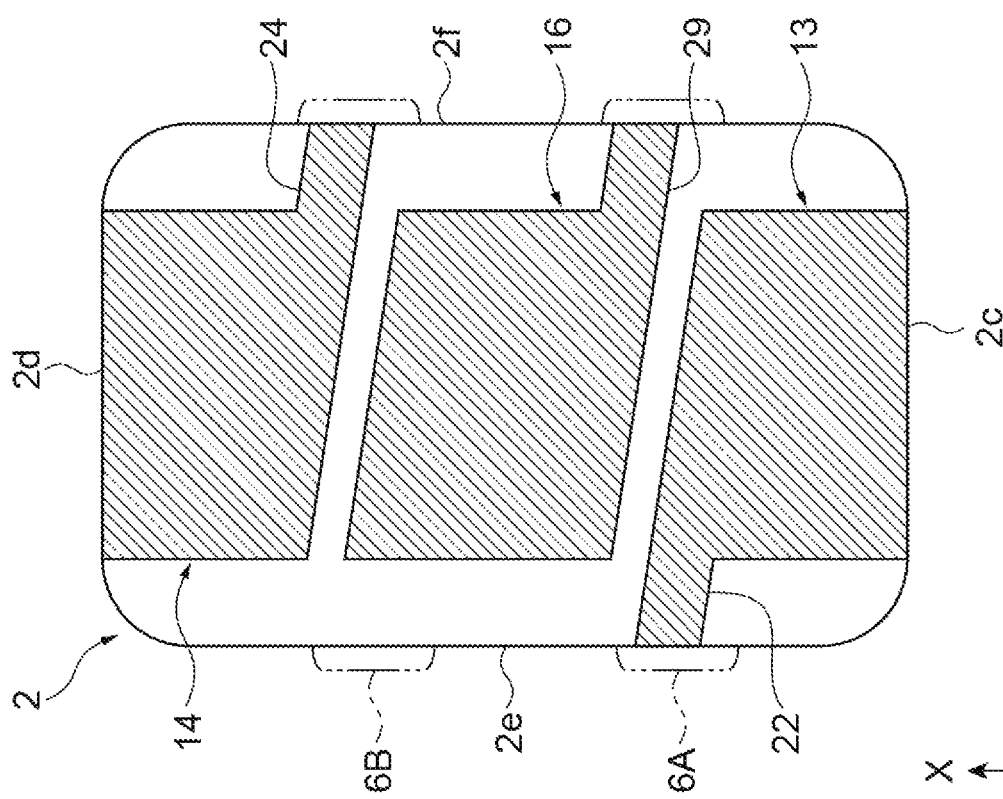
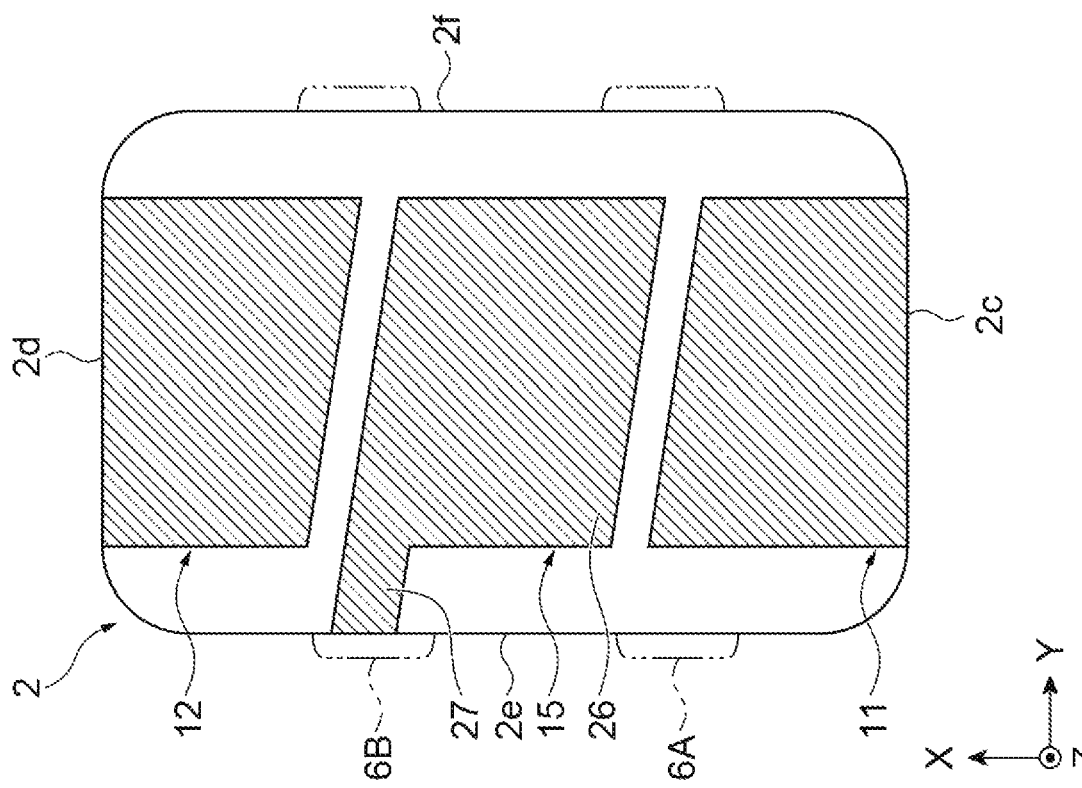

ELECTRONIC COMPONENT

CROSS REFERENCE TO RELATED APPLICATIONS

This application claims priority to Japanese Patent Application No. 2022-158416 filed on Sep. 30, 2022, the entire contents of which are incorporated by reference herein.

TECHNICAL FIELD

The present disclosure relates to an electronic component.

BACKGROUND

As a conventional electronic component, one described in Japanese Unexamined Patent Publication No. 2019-46876 is known. The electronic component includes an element body and a pair of terminal electrodes. Inside the element body, internal electrodes are formed so as to form two sets of capacitor portions. In the element body, a first internal electrode and a second internal electrode spaced apart from each other and a third internal electrode facing these internal electrodes are formed.

SUMMARY

Here, there has been a demand for improving the performance of an electronic component having a plurality of capacitor portions connected in series inside the element body.

The present disclosure has been made to solve such a problem, and it is an object of the present disclosure to provide an electronic component which has a plurality of series-connected capacitor portions and whose performance can be improved.

An electronic component according to the present disclosure includes: an element body having a first main surface and a second main surface facing each other in a first direction, a first end surface and a second end surface facing each other in a second direction perpendicular to the first direction, and a first side surface and a second side surface facing each other in a third direction perpendicular to the first and second directions; a first terminal electrode formed on the first end surface; a second terminal electrode formed on the second end surface; a first internal electrode provided in the element body and connected to the first terminal electrode at the first end surface; a second internal electrode provided in the element body and connected to the second terminal electrode at the second end surface; a third internal electrode provided in the element body and drawn out to the first side surface; and a fourth internal electrode provided in the element body and drawn out to the second side surface. The third internal electrode and the fourth internal electrode are electrically connected to each other through an external connection conductor formed on at least the first side surface and the second side surface. In the first direction, the first internal electrode faces the third internal electrode without facing the second internal electrode and the fourth internal electrode. In the first direction, the second internal electrode faces the fourth internal electrode without facing the first internal electrode and the third internal electrode.

In this electronic component, the first internal electrode connected to the first terminal electrode faces the third internal electrode, and the second internal electrode connected to the second terminal electrode faces the fourth internal electrode. Here, the third internal electrode and the fourth internal electrode are electrically connected to each other through the external connection conductor formed on at least the first side surface and the second side surface. With such a configuration, a capacitor portion formed by the first internal electrode and the third internal electrode and a capacitor portion formed by the second internal electrode and the fourth internal electrode are connected in series to each other through the external connection conductor. Therefore, it is possible to improve the reliability. In addition by using the terminal electrodes and the external connection conductor, it is possible to measure and inspect the presence or absence of short-circuit failure in each capacitor portion. In addition, the first internal electrode does not face the second internal electrode and the fourth internal electrode, and the second internal electrode does not face the first internal electrode and the third internal electrode. That is, between one capacitor portion and the other capacitor portion, there is no connection portion for connecting their internal electrodes to each other. For this reason, it is possible to suppress the occurrence of a situation in which a crack generated in one capacitor portion reaches the other capacitor portion along the connection portion. As a result, it is possible to suppress the occurrence of a situation in which the crack reaches both the capacitor portions to cause short-circuiting. As described above, it is possible to improve the performance of an electronic component having a plurality of capacitor portions connected in series to each other.

The first internal electrode and the second internal electrode may be arranged in outermost layers of stacked internal electrodes. Here, the first internal electrode and the second internal electrode are arranged in the outermost layers of the stacked internal electrodes. In this case, the internal electrode closest to the first terminal electrode on each main surface is the first internal electrode having the same polarity as the first terminal electrode, and the internal electrode closest to the second terminal electrode is the second internal electrode having the same polarity as the second terminal electrode. Therefore, it is possible to suppress surface leakage between the inner electrode of the outermost layer and the terminal electrode having an opposite polarity.

The element body may have a gap portion in which no internal electrode is formed when viewed from the first direction. In this case, it is possible to suppress the progress of a crack generated in one capacitor portion to the other capacitor portion.

A width of the gap portion in the second direction may be equal to or greater than an interlayer thickness of the element body. In this case, in the gap portion, it is possible to secure pressure resistance higher than the voltage breakdown between the layers.

The external connection conductor may extend to the first side surface, the second side surface, and the first main surface. On the second main surface, one end and the other end of the external connection conductor may be spaced apart from each other in the third direction. In this case, an exposed portion exposed to the external connection conductor is formed on the second main surface. Therefore, during mounting, the electronic component can be transported by sucking the exposed portion with a tool.

The external connection conductor may be arranged so as not to overlap the first internal electrode and the second internal electrode when viewed from the first direction. In this case, it is possible to suppress the occurrence of a floating capacitance between the external connection conductor and the first internal electrode and the second internal electrode.

The first terminal electrode and the second terminal electrode may include a conductive resin layer. In this case, the reliability of the electronic component can be improved by reducing the influence of the stress caused by the bending of the mounting board.

An electronic component according to the present disclosure includes: an element body having a first main surface and a second main surface facing each other in a first direction, a first end surface and a second end surface facing each other in a second direction perpendicular to the first direction, and a first side surface and a second side surface facing in a third direction perpendicular to the first and second directions; a first terminal electrode formed on the first end surface; a second terminal electrode formed on the second end surface; a first internal electrode provided in the element body and connected to the first terminal electrode at the first end surface; a second internal electrode provided in the element body and connected to the second terminal electrode at the second end surface; a third internal electrode provided in the element body and drawn out to the first side surface; a fourth internal electrode provided in the element body and drawn out to the second side surface; a fifth internal electrode provided in the element body, arranged between the first internal electrode and the second internal electrode in the second direction, and drawn out to the first side surface; and a sixth internal electrode provided in the element body, arranged between the third internal electrode and the fourth internal electrode in the second direction, and drawn out to the second side surface. The third internal electrode and the sixth internal electrode are electrically connected to each other through a first external connection conductor formed on at least the first side surface and the second side surface. The fourth internal electrode and the fifth internal electrode are electrically connected to each other through a second external connection conductor formed on at least the first side surface and the second side surface. In the first direction, the first internal electrode faces the third internal electrode without facing the second internal electrode, the fourth internal electrode, the fifth internal electrode, and the sixth internal electrode. In the first direction, the second internal electrode faces the fourth internal electrode without facing the first internal electrode, the third internal electrode, the fifth internal electrode, and the sixth internal electrode. In the first direction, the fifth internal electrode faces the sixth internal electrode without facing the first internal electrode, the second internal electrode, the third internal electrode, and the fourth internal electrode.

In this electronic component, the first internal electrode connected to the first terminal electrode faces the third internal electrode, the second internal electrode connected to the second terminal electrode faces the fourth internal electrode, and the fifth internal electrode faces the sixth internal electrode. Here, the third internal electrode and the sixth internal electrode are electrically connected to each other through the first external connection conductor formed on at least the first side surface and the second side surface. In addition, the fourth internal electrode and the fifth internal electrode are electrically connected to each other through the second external connection conductor formed on at least the first side surface and the second side surface. With such a configuration, a capacitor portion formed by the first internal electrode and the third internal electrode, a capacitor portion formed by the fifth internal electrode and the sixth internal electrode, and a capacitor portion formed by the second internal electrode and the fourth internal electrode are connected in series to each other through the first external connection conductor and the second external connection conductor. Therefore, it is possible to improve the reliability. In addition, the first internal electrode does not face the second internal electrode, the fourth internal electrode, the fifth internal electrode, and the sixth internal electrode. The second internal electrode does not face the first internal electrode, the third internal electrode, the fifth internal electrode, and the sixth internal electrode. The fifth internal electrode does not face the first internal electrode, the second internal electrode, the third internal electrode, and the fourth internal electrode. That is, between one capacitor portion and the other capacitor portion adjacent to each other, there is no connection portion for connecting their internal electrodes to each other. For this reason, it is possible to suppress the occurrence of a situation in which a crack generated in one capacitor portion reaches the other capacitor portion along the connection portion. As a result, it is possible to suppress the occurrence of a situation in which the crack reaches both the capacitor portions adjacent to each other to cause short-circuiting. As described above, it is possible to improve the performance of an electronic component having a plurality of capacitor portions connected in series to each other.

According to the present disclosure, it is possible to provide an electronic component which has a plurality of series-connected capacitor portions and whose performance can be improved.

BRIEF DESCRIPTION OF THE DRAWINGS

FIG. 1A is a plan view of an electronic component according to the present embodiment, and FIG. 1B is a front view of the electronic component according to the present embodiment.

FIG. 2A is a cross-sectional view taken along the line IIA-IIA shown in FIG. 1A, and FIG. 2B is a cross-sectional view taken along the line IIB-IIB shown in FIG. 1B.

FIGS. 7A and 7B are diagrams showing electronic components according to modification examples.

FIGS. 8A and 8B are diagrams showing electronic components according to modification examples.

FIGS. 10A and 10B are diagrams showing internal electrodes of the electronic component according to the modification example.

DETAILED DESCRIPTION

Figure 3C:
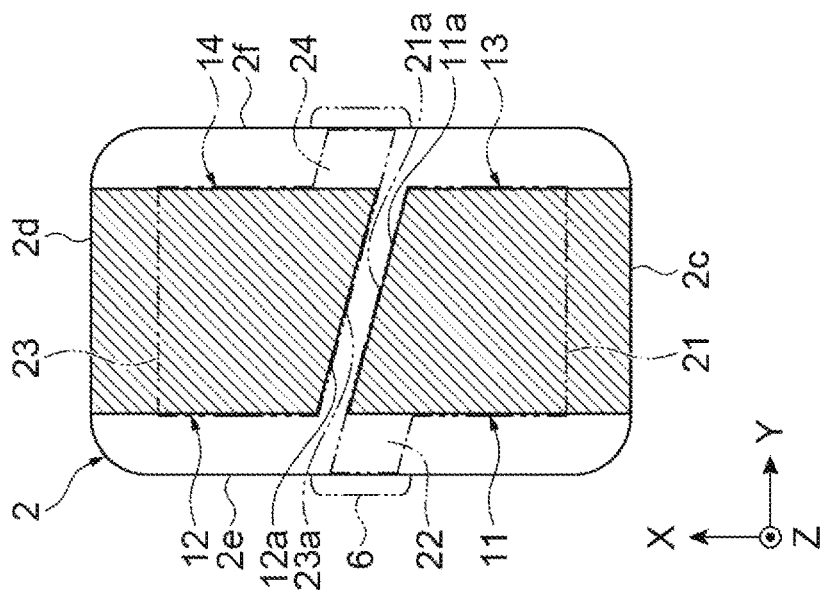
FIG. 3C is a diagram showing how the first internal electrode and the second internal electrode overlap the third internal electrode and the fourth internal electrode.

Hereinafter, embodiments of the present disclosure will be described in detail with reference to the accompanying diagrams. In addition, in the description, the same elements or elements having the same functions are denoted by the same reference numerals, and repeated descriptions thereof will be omitted.

Figure 3B:
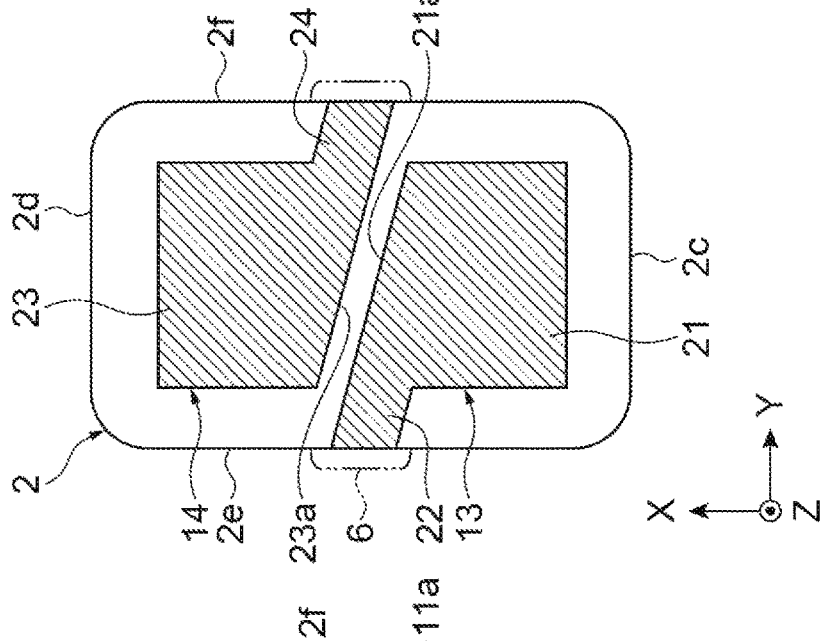
FIG. 3B is a diagram showing a third internal electrode and a fourth internal electrode.
Figure 3A:
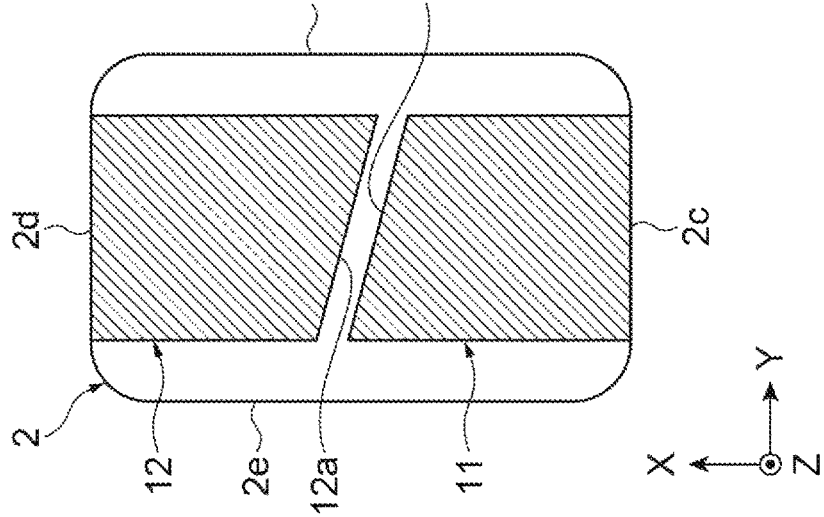
FIG. 3A is a diagram showing a first internal electrode and a second internal electrode.

First, the configuration of an electronic component 100 according to the present embodiment will be described with reference to FIGS. 1A and 1B to 3A, 3B and 3C. FIG. 1A is a plan view of an electronic component according to the present embodiment, and FIG. 1B is a front view of the electronic component according to the present embodiment. FIG. 2A is a cross-sectional view taken along the line IIA-IIA shown in FIG. 1A, and FIG. 2B is a cross-sectional view taken along the line IIB-IIB shown in FIG. 1B. FIG. 3A is a diagram showing a first internal electrode and a second internal electrode, FIG. 3B is a diagram showing a third internal electrode and a fourth internal electrode, and FIG. 3C is a diagram showing how the first internal electrode and the second internal electrode overlap the third internal electrode and the fourth internal electrode. In FIG. 3C, the third internal electrode and the fourth internal electrode are indicated by virtual lines.

In addition, in the following description, an XYZ coordinate system may be set for the electronic component 100 for explanation. The Z-axis direction (first direction) is a stacking direction in which internal electrodes, which will be described later, are stacked. The Z-axis direction is a direction perpendicular to the surface of a circuit board on which components are mounted during mounting. The X-axis direction (second direction) is a direction perpendicular to the Z-axis direction, and is a direction parallel to the surface of the circuit board during mounting. In addition, the X-axis direction corresponds to a longitudinal direction in which an element body 2 extends. The Y-axis direction (third direction) is a direction perpendicular to the Z-axis direction and the X-axis direction, and is a direction parallel to the surface of the circuit board during mounting and perpendicular to the X-axis direction. In FIGS. 1A and 1B, the upper side is a positive side in the Z-axis direction, and the lower side is a negative side in the Z-axis direction.

As shown in FIGS. 1A and 1B, the electronic component 100 includes the element body 2, a first terminal electrode 3, a second terminal electrode 4, and an external connection conductor 6. As shown in FIG. 2A, the electronic component 100 includes a first internal electrode 11, a second internal electrode 12, a third internal electrode 13, and a fourth internal electrode 14 inside the element body 2.

As shown in FIGS. 1A and 1B, the element body 2 is a rectangular parallelepiped component extending along the X-axis direction that is the longitudinal direction. The element body 2 has a first main surface 2a and a second main surface 2b facing each other in the Z-axis direction, a first end surface 2c and a second end surface 2d facing each other in the X-axis direction, and a first side surface 2e and a second side surface 2f facing each other in the Y-axis direction. The first main surface 2a is arranged on the negative side in the Z-axis direction, and the second main surface 2b is arranged on the positive side in the Z-axis direction. The first end surface 2c is arranged on the negative side in the X-axis direction, and the second end surface 2d is arranged on the positive side in the X-axis direction. The first side surface 2e is arranged on the negative side in the Y-axis direction, and the second side surface 2f is arranged on the positive side in the Y-axis direction. Among these, the first main surface 2a is a mounting surface facing a mounting board during mounting.

The shape of the element body 2 is not particularly limited, but has a rectangular parallelepiped shape in which the size in the X-axis direction is larger than the sizes in the Z-axis direction and the Y-axis direction. Examples of the rectangular parallelepiped shape include a rectangular parallelepiped shape with chamfered corners and ridges and a rectangular parallelepiped shape with rounded corners and ridges. For example, the length of the element body 2 in the X-axis direction may be 0.5 to 7.7 mm, the length of the element body 2 in the Y-axis direction may be 0.29 to 4.7 mm, and the length of the element body 2 in the Z-axis direction may be 0.29 to 4.0 mm.

The element body 2 is formed by stacking a plurality of dielectric layers (dielectric layers 5 shown in FIG. 2A) in the Z-axis direction. Each dielectric layer is configured as, for example, a sintered body of a ceramic green sheet containing a dielectric material ($BaTiO_3$-based dielectric ceramic, $Ba(Ti, Zr)O_3$-based dielectric ceramic, $(Ba, Ca)TiO_3$-based dielectric ceramic, and the like). In the actual element body 2, the respective dielectric layers 5 are integrated to such an extent that the boundary between each of the dielectric layers 5 cannot be visually recognized.

The terminal electrodes 3 and 4 are provided so as to cover the end surfaces 2c and 2d of the element body 2. The terminal electrodes 3 and 4 are portions for electrically connecting electronic component 100 to other members. The terminal electrodes 3 and 4 have main body portions 3a and 4a and wrap-around portions 3b and 4b, respectively. The main body portions 3a and 4a are formed on the end surfaces 2c and 2d of the element body 2, respectively. The main body portions 3a and 4a are formed so as to cover the entire surfaces of the end surfaces 2c and 2d, respectively. The wrap-around portions 3b and 4b are formed so as to wrap around the main surfaces 2a and 2b and the side surfaces 2e and 2f from the main body portions 3a and 4a. The wrap-around portion 3b is formed so as to cover parts of the main surfaces 2a and 2b and the side surfaces 2e and 2f near the first end surface 2c. The wrap-around portion 4b is formed so as to cover parts of the main surfaces 2a and 2b and the side surfaces 2e and 2f near the second end surface 2d.

The external connection conductor 6 is a conductor for connecting the third internal electrode 13 and the fourth internal electrode 14 to each other outside the element body 2. The external connection conductor 6 is formed at an approximately central position in the X-axis direction in the element body 2. The external connection conductor 6 is formed so as to be spaced apart from the terminal electrodes 3 and 4 in the X-axis direction. The external connection conductor 6 is formed in an approximately U shape so as to surround the element body 2 when viewed from the X-axis direction (see FIG. 2B). The external connection conductor 6 extends to the first side surface 2e, the second side surface 2f, and the first main surface 2a. The external connection conductor 6 extends over the entire length in the Z-axis direction on the side surfaces 2e and 2f. The external connection conductor 6 extends over the entire length in the Y-axis direction on the first main surface 2a. The external connection conductor 6 is formed in a part of the second main surface 2b near the side surface 2f and a part of the second main surface 2b near the side surface 2e. On the second main surface 2b, an end 6a of the external connection conductor 6 on the negative side in the Y-axis direction and an end 6b of the external connection conductor 6 on the positive side in the Y-axis direction are spaced apart from each other in the Y-axis direction. Therefore, a region near the central position of the second main surface 2b is exposed to the external connection conductor 6.

Materials for the terminal electrodes 3 and 4 and the external connection conductor 6 are not particularly limited, but may contain copper. In addition, the terminal electrodes 3 and 4 and the external connection conductor 6 may be copper baking layers, and an Ni plating layer, an Sn plating layer, and the like may be formed on these baking layers. In addition, the terminal electrodes 3 and 4 may include a conductive resin layer formed of a material such as silver.

As shown in FIG. 2A, the internal electrodes 11, 12, 13, and 14 are flat conductor patterns extending in parallel to the XY plane. A plurality of internal electrodes 11, 12, 13, and 14 are formed in the Z-axis direction. The first internal electrode 11 is provided in a region on the negative side in the X-axis direction inside the element body 2, and is connected to the first terminal electrode 3 at the first end surface 2c. The second internal electrode 12 is provided in a region on the positive side in the X-axis direction inside the element body 2, and is connected to the second terminal electrode 4 at the second end surface 2d. The first internal electrode 11 and the second internal electrode 12 are arranged within the same plane. That is, the first internal electrode 11 and the second internal electrode 12 are formed on the same dielectric layer 5, and accordingly their positions in the Z-axis direction are the same. Before stacking, conductor patterns of the first internal electrode 11 and the second internal electrode 12 are formed on the ceramic green sheet of the dielectric layer 5.

The third internal electrode 13 is provided in a region on the negative side in the X-axis direction inside the element body 2, and is drawn out to the first side surface 2e (see FIG. 3B). The fourth internal electrode 14 is provided in a region on the positive side in the X-axis direction inside the element body 2, and is drawn out to the second side surface 2f (see FIG. 3B). The third internal electrode 13 and the fourth internal electrode 14 are arranged within the same plane. That is, the third internal electrode 13 and the fourth internal electrode 14 are formed on the same dielectric layer 5, and accordingly their positions in the Z-axis direction are the same. Before stacking, conductor patterns of the third internal electrode 13 and the fourth internal electrode 14 are formed on the ceramic green sheet of the dielectric layer 5. The third internal electrode 13 and the fourth internal electrode 14 are electrically connected to each other through the external connection conductor 6.

As shown in FIG. 3C, in the Z-axis direction, the first internal electrode 11 faces the third internal electrode 13 without facing the second internal electrode 12 and the fourth internal electrode 14. In the Z-axis direction, the second internal electrode 12 faces the fourth internal electrode 14 without facing the first internal electrode 11 and the third internal electrode 13. The first internal electrode 11 and the second internal electrode 12 are arranged so as to be spaced apart from the second internal electrode 12 and the fourth internal electrode 14 in the X-axis direction.

An example of a specific shape of each of the internal electrodes 11, 12, 13, and 14 will be described with reference to FIGS. 3A to 3C. As shown in FIG. 3A, the first internal electrode 11 extends from the first end surface 2c to the positive side in the X-axis direction through the central position of the element body 2. An edge portion 11a of the first internal electrode 11 on the inner side in the X-axis direction (positive side in the X-axis direction) is inclined so as to be toward the negative side in the X-axis direction as moving from the negative side to the positive side in the Y-axis direction. An edge portion of the first internal electrode 11 on the negative side in the X-axis direction is exposed from the first end surface 2c and connected to the first terminal electrode 3. The edge portion of the first internal electrode 11 on the negative side in the Y-axis direction is spaced apart from and parallel to the first side surface 2e. The edge portion of the first internal electrode 11 on the positive side in the Y-axis direction is spaced apart from and parallel to the second side surface 2f.

The second internal electrode 12 extends from the second end surface 2d to the negative side in the X-axis direction through the central position of the element body 2. An edge portion 12a of the second internal electrode 12 on the inner side in the X-axis direction (negative side in the X-axis direction) is inclined so as to be toward the negative side in the X-axis direction as moving from the negative side to the positive side in the Y-axis direction. The edge portion 12a of the second internal electrode 12 is parallel to the edge portion 11a of the first internal electrode 11 while being spaced apart from each other in the X-axis direction. An edge portion of the second internal electrode 12 on the positive side in the X-axis direction is exposed from the second end surface 2d and connected to the second terminal electrode 4. The edge portion of the second internal electrode 12 on the negative side in the Y-axis direction is spaced apart from and parallel to the first side surface 2e. The edge portion of the second internal electrode 12 on the positive side in the Y-axis direction is spaced apart from and parallel to the second side surface 2f. The edge portions of the second internal electrode 12 on both sides in the Y-axis direction are arranged at the same positions in the Y-axis direction as the edge portions of the first internal electrode 11 on both sides in the Y-axis direction.

As shown in FIG. 3B, the third internal electrode 13 includes a main body portion 21 and a lead-out portion 22. The main body portion 21 has the same outer shape as the first internal electrode 11 when viewed from the Z-axis direction, and is a portion arranged so as to overlap the first internal electrode 11. Therefore, an edge portion 21a of the main body portion 21 on the positive side in the X-axis direction has the same shape as the edge portion 11a of the first internal electrode 11. An edge portion of the main body portion 21 on the negative side in the X-axis direction is spaced apart from the first end surface 2c toward the positive side in the X-axis direction. The lead-out portion 22 is connected to the external connection conductor 6 by extending from the main body portion 21 toward the negative side in the Y-axis direction and being exposed on the first side surface 2e. The lead-out portion 22 extends toward the negative side in the Y-axis direction while being inclined so as to continue from the edge portion 21a of the main body portion 21.

The fourth internal electrode 14 includes a main body portion 23 and a lead-out portion 24. The main body portion 23 has the same outer shape as the second internal electrode 12 when viewed from the Z-axis direction, and is a portion arranged so as to overlap the second internal electrode 12. Therefore, an edge portion 23a of the main body portion 23 on the negative side in the X-axis direction has the same shape as the edge portion 12a of the second internal electrode 12. An edge portion of the main body portion 23 on the positive side in the X-axis direction is spaced apart from the second end surface 2d toward the positive side in the X-axis direction. The lead-out portion 24 is connected to the external connection conductor 6 by extending from the main body portion 23 toward the positive side in the Y-axis direction and being exposed on the second side surface 2f. The lead-out portion 24 extends toward the positive side in the Y-axis direction while being inclined so as to continue from the edge portion 23a of the main body portion 23.

From the above, as shown in FIG. 2A, inside the element body 2, a capacitor portion 10A is formed in a region on the negative side in the X-axis direction inside, and a capacitor portion 10B is formed in a region on the positive side in the X-axis direction. The capacitor portion 10A is formed by alternately stacking a plurality of first internal electrodes 11 and a plurality of third internal electrodes 13. The capacitor portion 10B is formed by alternately stacking a plurality of second internal electrodes 12 and a plurality of fourth internal electrodes 14.

The element body 2 has a gap portion 25 in which the internal electrodes 11, 12, 13, and 14 are not formed when viewed from the Z-axis direction. The gap portion 25 is formed between the capacitor portion 10A and the capacitor portion 10B. Specifically, the gap portion 25 is formed by a gap between the edge portion 11a of the first internal electrode 11 and the edge portion 12a of the second internal electrode 12 and a gap between the edge portion 21a of the third internal electrode 13 and the edge portion 23a of the fourth internal electrode 14 that are continuous in the Z-axis direction. The width of the gap portion 25 in the X-axis direction is equal to or greater than the interlayer thickness of the element body 2. The interlayer thickness is the thickness of one dielectric layer 5, and is defined by the thickness between the internal electrodes 11 and 13 and the thickness between the internal electrodes 12 and 14. The interlayer thickness is set to about 1 to 50 µm. On the other hand, the width of the gap portion 25 is set to about 1 to 1000 µm.

The first internal electrode 11 and the second internal electrode 12 are arranged in the outermost layers of the stacked internal electrodes. That is, among the internal electrodes arranged inside the element body 2, the first internal electrode 11 and the second internal electrode 12 are arranged on the most positive side in the Z-axis direction, and the first internal electrode 11 and the second internal electrode 12 are arranged on the most negative side in the Z-axis direction.

The polarities of the capacitor portions 10A and 10B will be described with reference to FIG. 4A. As shown in FIG. 4A, when the electronic component 100 is mounted, it is assumed that the first terminal electrode 3 has a positive polarity and the second terminal electrode 4 has a negative polarity. Since the third internal electrode 13 and the fourth internal electrode 14 are connected to each other through the external connection conductor 6, the third internal electrode 13 and the fourth internal electrode 14 have the same potential. At this time, in the capacitor portion 10A, the first internal electrode 11 connected to the first terminal electrode 3 has a positive polarity, and the third internal electrode 13 has a negative polarity. On the other hand, in the capacitor portion 10B, the fourth internal electrode 14 connected to the second terminal electrode 4 has a positive polarity, and the second internal electrode 12 has a negative polarity. Thus, between the first terminal electrode 3 and the second terminal electrode 4, there are the capacitor portion 10A and the capacitor portion 10B that are connected in series to each other.

Next, the function and effect of the electronic component 100 according to the present embodiment will be described.

Figure 5A:
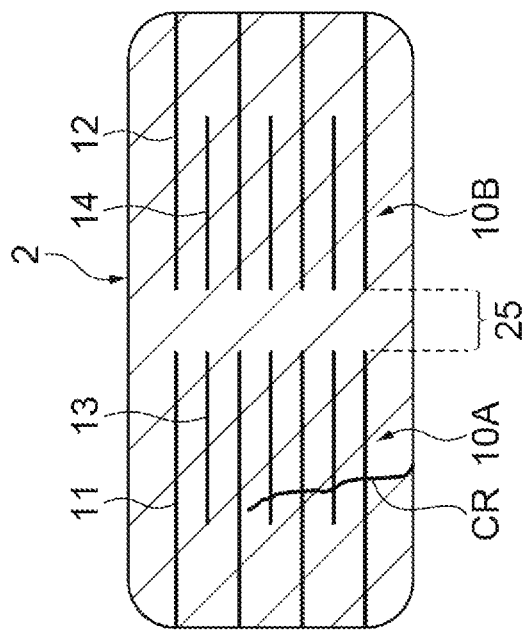
FIGS. 5A and 5B are cross-sectional views showing an electronic component according to an embodiment.
Figure 5B:
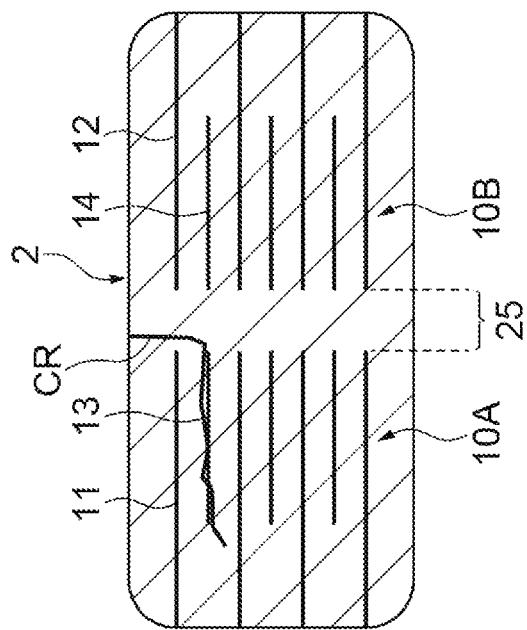
Figure 5C:
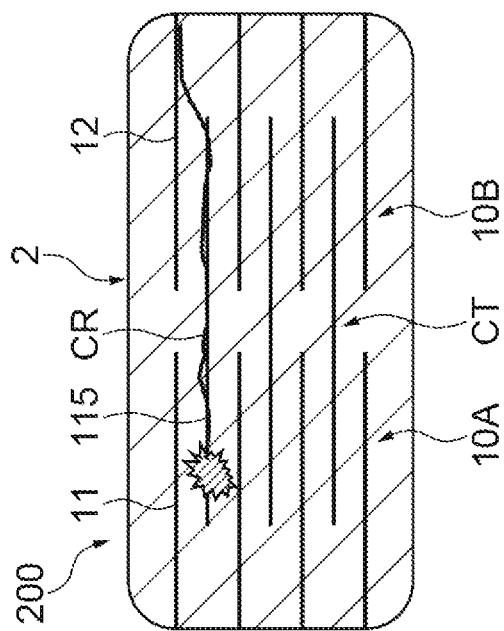
FIGS. 5C and 5D are cross-sectional views showing an electronic component according to a comparative example.

First, an electronic component according to a comparative example will be described. FIG. 5C is a schematic cross-sectional view showing the internal structure of the element body 2 of an electronic component 200 according to a comparative example. The electronic component 200 includes an internal electrode 115 that simultaneously forms the first capacitor portion 10A and the second capacitor portion 10B instead of the third internal electrode 13 and the fourth internal electrode 14 connected to each other by the external connection conductor of the present embodiment. The internal electrode 115 extends so as to face both the first internal electrode 11 and the second internal electrode 12. Therefore, the gap portion 25 is not formed in the element body 2, and the internal electrode 115 has a connection portion CT that connects the first capacitor portion 10A and the second capacitor portion 10B to each other. Since such an electronic component 200 does not have an external connection conductor, when one of the first capacitor portion 10A and the second capacitor portion 10B is short-circuited, the short-circuiting cannot be detected. In addition, when a crack CR occurs in one first capacitor portion 10A, the crack CR may reach the other second capacitor portion 10B along the connection portion CT. In this case, both the capacitor portions 10A and 10B are short-circuited due to the influence of the short-circuiting of one first capacitor portion 10A.

Figure 5D:
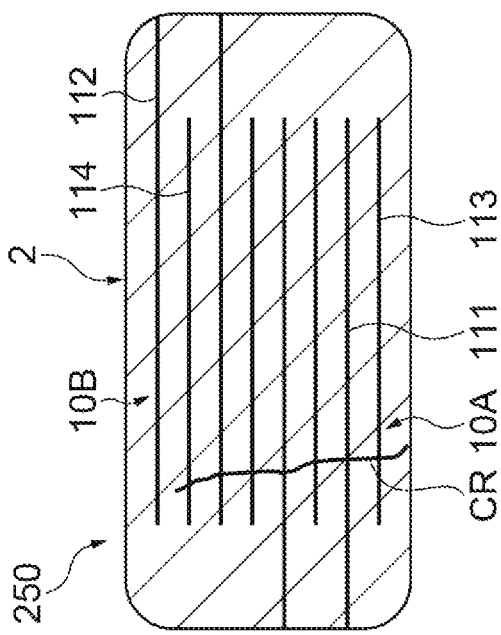

FIG. 5D is a schematic cross-sectional view of an electronic component 250 according to a comparative example having the configuration disclosed in Japanese Unexamined Patent Publication No. 2019-46876. The electronic component 250 includes the capacitor portions 10A and 10B in the stacking direction. In the electronic component 250, it is possible to detect the short-circuiting of each of the capacitor portions 10A and 10B. However, since the interlayer distance is short, there is a possibility that both the capacitor portions 10A and 10B will be short-circuited due to the difference in the occurrence of the bending crack CR.

Figure 4B:
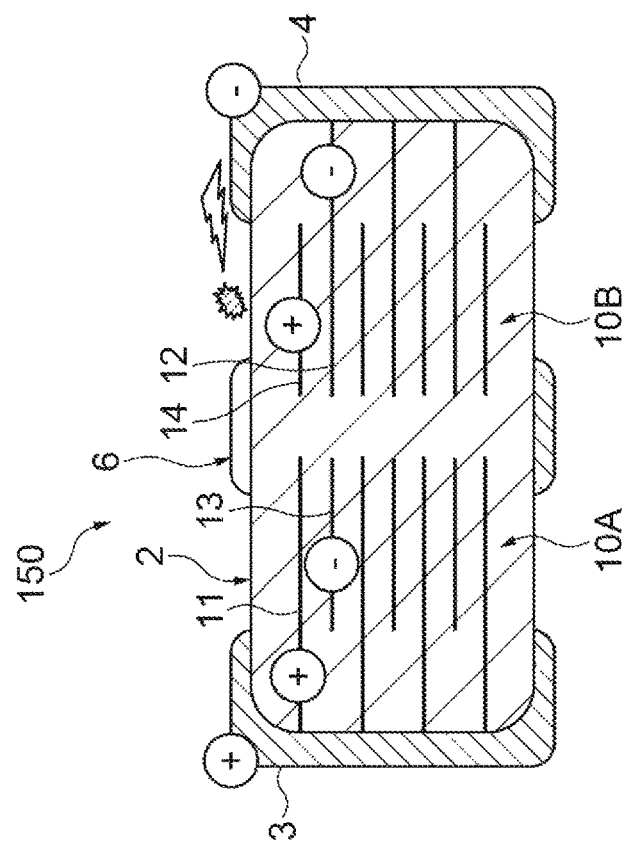
FIG. 4B is a cross-sectional view showing an electronic component according to a comparative example.
Figure 4A:
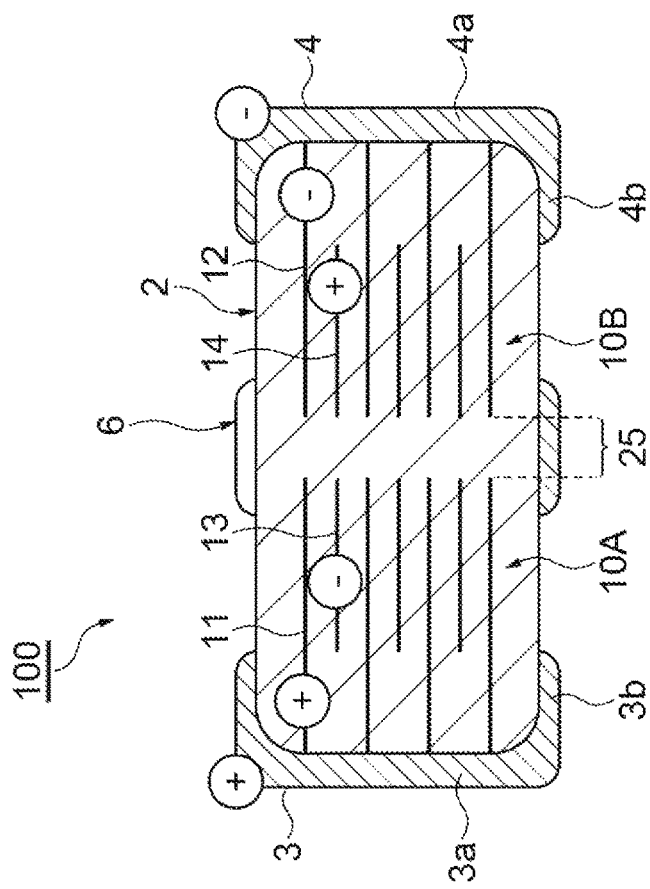
FIG. 4A is a cross-sectional view showing an electronic component according to an embodiment.

FIG. 4B is a schematic cross-sectional view showing an electronic component 150 according to a comparative example. In the electronic component 150, the third internal electrode 13 and the fourth internal electrode 14 are not formed on the same plane, and the first internal electrode 11 and the second internal electrode 12 are not formed on the same plane. In the second capacitor portion 10B, the fourth internal electrode is the outermost layer. In this case, in the second capacitor portion 10B, surface leakage may occur between the fourth internal electrode (positive electrode) of the outermost layer and the second terminal electrode 4 (negative electrode) having an opposite polarity.

In contrast, in the electronic component 100 according to the present embodiment, the first internal electrode 11 connected to the first terminal electrode 3 faces the third internal electrode 13, and the second internal electrode 12 connected to the second terminal electrode 4 faces the fourth internal electrode 14. Here, the third internal electrode 13 and the fourth internal electrode 14 are electrically connected to each other through the external connection conductor 6 formed on at least the first side surface 2e and the second side surface 2f. With such a configuration, the first capacitor portion 10A formed by the first internal electrode 11 and the third internal electrode 13 and the second capacitor portion 10B formed by the second internal electrode 12 and the fourth internal electrode 14 are connected in series to each other through the external connection conductor 6. Therefore, it is possible to improve the reliability. For example, as shown in FIG. 5A, even if the crack CR occurs in the first capacitor portion 10A to cause short-circuiting, the second capacitor portion 10B can continue to be used. In addition, the presence or absence of short-circuit failure in the first capacitor portion 10A can be measured and inspected by using the first terminal electrode 3 and the external connection conductor 6, and the presence or absence of short-circuit failure in the second capacitor portion 10B can be measured and inspected by using the second terminal electrode 4 and the external connection conductor 6.

In addition, the first internal electrode 11 does not face the second internal electrode 12 and the fourth internal electrode 14, and the second internal electrode 12 does not face the first internal electrode 11 and the third internal electrode 13. That is, between one first capacitor portion 10A and the other second capacitor portion 10B, there is no connection portion CT (see FIG. 5C) for connecting their internal electrodes to each other. For this reason, as shown in FIG. 5B, it is possible to suppress the occurrence of a situation in which the crack CR generated in one first capacitor portion 10A reaches the other second capacitor portion 10B along the connection portion CT. As a result, it is possible to suppress the occurrence of a situation in which the crack CR reaches both the capacitor portions 10A and 10B to cause short-circuiting.

Here, the first internal electrode 11 and the second internal electrode 12 are arranged in the outermost layers of the stacked internal electrodes. In this case, as shown in FIG. 4A, the internal electrode closest to the first terminal electrode 3 on each main surface is the first internal electrode 11 having the same polarity as the first terminal electrode 3, and the internal electrode closest to the second terminal electrode 4 is the second internal electrode 12 having the same polarity as the second terminal electrode 4. Therefore, it is possible to suppress surface leakage between the inner electrode of the outermost layer and the terminal electrode having an opposite polarity. As described above, it is possible to improve the performance of an electronic component having a plurality of capacitor portions connected in series to each other.

The element body 2 may have the gap portion 25 in which no internal electrode is formed when viewed from the Z-axis direction. In this case, it is possible to suppress the progress of a crack generated in one first capacitor portion 10A to the other second capacitor portion 10B.

The width of the gap portion 25 in the X-axis direction may be equal to or greater than the interlayer thickness of the element body 2. In this case, in the gap portion 25, it is possible to secure pressure resistance higher than the voltage breakdown between the layers. In addition, the width of the gap portion 25 in the X-axis direction is not particularly limited, and may be any size. For example, the width of the gap portion 25 in the X-axis direction may be 1% or more of the size of the element body 2 in the Y-axis direction.

The external connection conductor 6 may extend to the first side surface 2e, the second side surface 2f, and the first main surface 2a, and one end 6a and the other end 6b of the external connection conductor 6 may be spaced apart from each other in the Y-axis direction on the second main surface 2b. In this case, an exposed portion 46 (see FIG. 1A) exposed to the external connection conductor 6 is formed on the second main surface 2b. Therefore, during mounting, the electronic component 100 can be transported by sucking the exposed portion 46 with a tool.

The first terminal electrode 3 and the second terminal electrode 4 may include a conductive resin layer. In this case, the reliability of the electronic component 100 can be improved due to the effect of reducing the influence of the stress caused by the bending of the mounting board.

The present disclosure is not limited to the embodiment described above.

Figure 6:
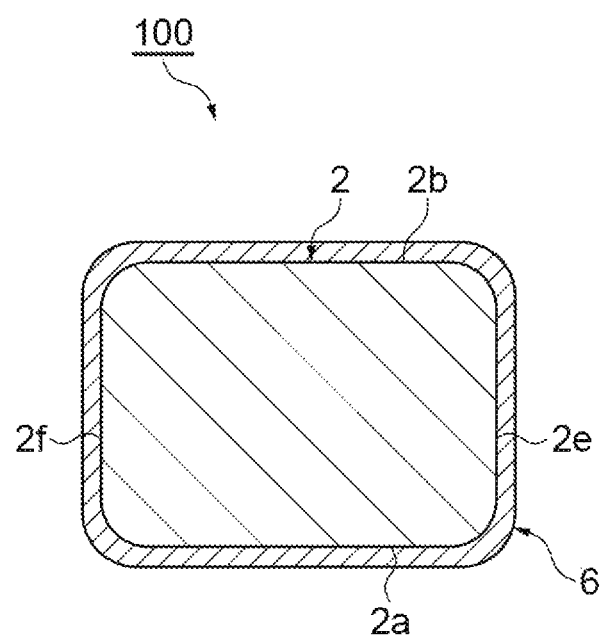
FIG. 6 is a diagram showing an electronic component according to a modification example.

The configuration of the external connection conductor 6 is not limited to the configuration shown in FIG. 2B. For example, a configuration shown in FIG. 6 may be adopted. The external connection conductor 6 shown in FIG. 6 has a structure surrounding the element body 2 over the entire circumference. Specifically, the external connection conductor 6 extends over the entire length of the second main surface 2b in the Y-axis direction so that the exposed portion 46 shown in FIG. 2B is not formed on the second main surface 2b.

The shape of the internal electrode is also not limited to the embodiment described above. For example, structures shown in FIGS. 7A and 7B may be adopted. In the examples shown in FIGS. 7A and 7B, the edge portion 11a of the first internal electrode 11 and the edge portion 12a of the second internal electrode 12 extend in parallel to the Y-axis direction. In addition, the lead-out portion 22 of the third internal electrode 13 and the lead-out portion 24 of the fourth internal electrode 14 extend so as to be inclined with respect to the Y-axis direction from the ends of the main body portions 21 and 23 on the inner side in the X-axis direction. In this case, the lead-out portions 22 and 24 are arranged in a gap portion between the first internal electrode 11 and the second internal electrode 12.

At this time, as shown in FIG. 7A, the external connection conductor 6 may be arranged so as not to overlap the first internal electrode 11 and the second internal electrode 12 when viewed from the Z-axis direction. That is, the width of the external connection conductor 6 in the X-axis direction is equal to or less than the gap between the edge portions 11a and 12a. In this case, it is possible to suppress the occurrence of a floating capacitance between the external connection conductor 6 and the first internal electrode 11 and the second internal electrode 12. For example, as shown in FIG. 7B, when the width of the external connection conductor 6 in the X-axis direction is larger than the gap between the edge portions 11a and 12a, a floating capacitance may occur at a portion where the external connection conductor 6 overlaps the internal electrodes 11 and 12. However, the configuration shown in FIG. 7B may be adopted.

In addition, configurations shown in FIGS. 8A and 8B may be adopted. As shown in FIG. 8A, the edge portions 11a, 12a, 21a, and 23a of the internal electrodes 11, 12, 13, and 14 may have stepped shapes. In addition, as shown in FIG. 8B, the edge portions 11a, 12a, 21a, and 23a of the internal electrodes 11, 12, 13, and 14 may all have shapes extending in parallel to the Y-axis direction. According to the configurations shown in FIGS. 8A and 8B, since the overlapping area of the internal electrodes can be increased, it is possible to increase the capacitance.

Figure 9B:
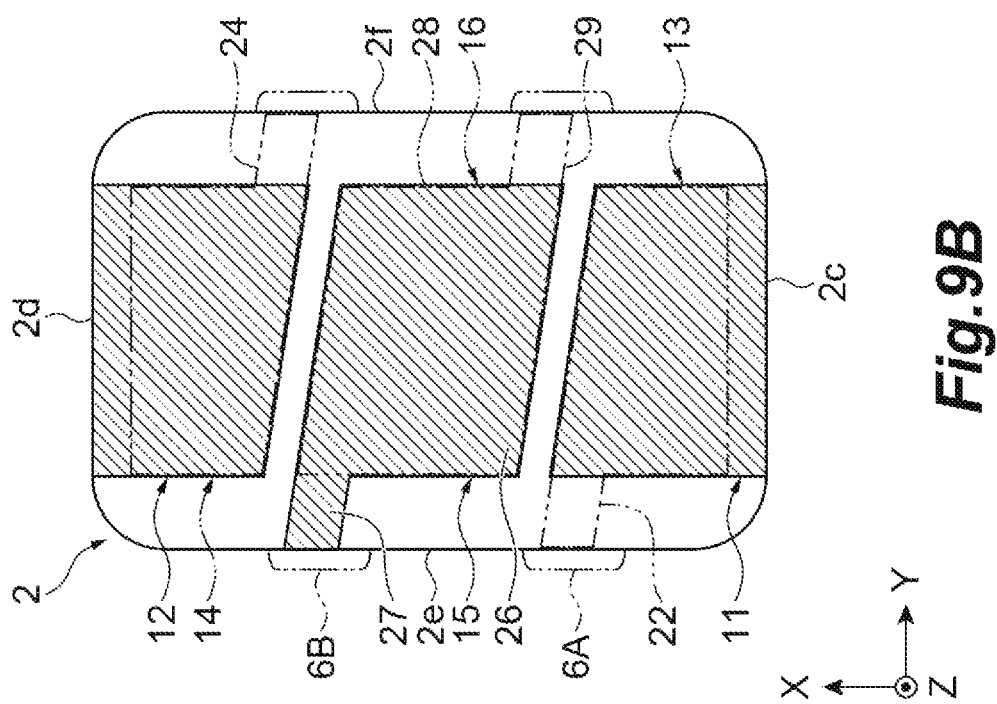
FIGS. 9A and 9B are diagrams showing an electronic component according to a modification example.
Figure 9A:
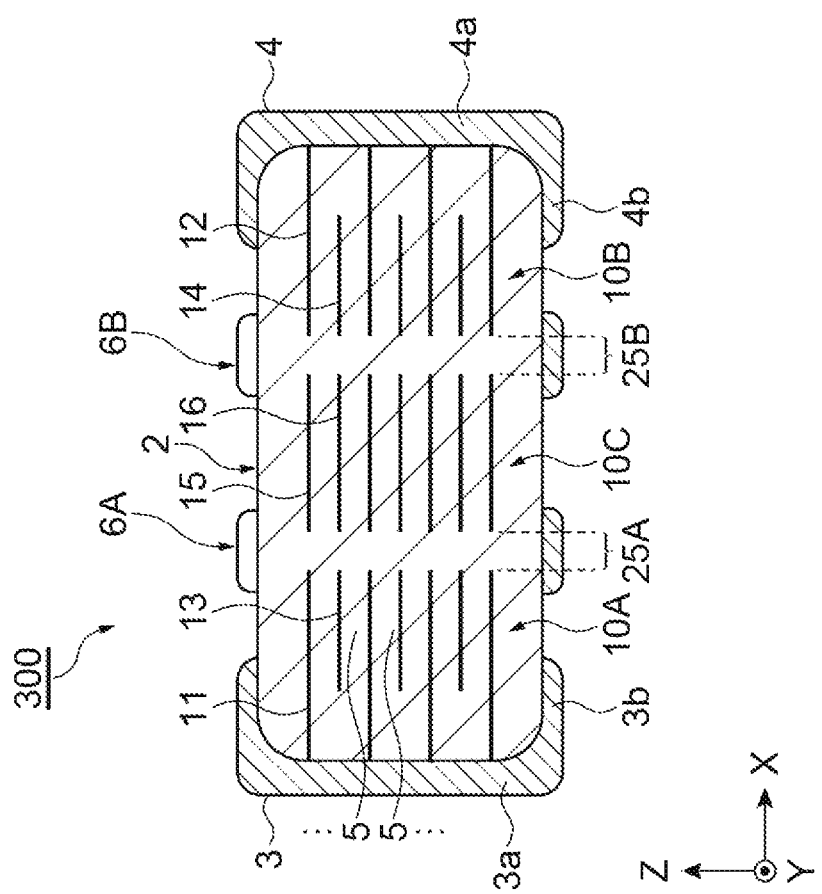

In addition, an electronic component 300 shown in FIG. 9A may be adopted. The electronic component 300 includes a fifth internal electrode 15 and a sixth internal electrode between the internal electrodes 11 and 13 and the internal electrodes 12 and 14. The fifth internal electrode 15 is formed within the same plane as the internal electrodes 11 and 12 (see FIG. 10A). The sixth internal electrode 16 is formed within the same plane as the internal electrodes 13 and 14 (see FIG. 10B). The fifth internal electrode includes a main body portion 26 and a lead-out portion 27 drawn out to the side surface 2e. The sixth internal electrode includes a main body portion 28 and a lead-out portion 29 drawn out to the side surface 2f. The main body portion 26 of the fifth internal electrode 15 and the main body portion 28 of the sixth internal electrode 16 face each other in the Z-axis direction and do not face other internal electrodes. The lead-out portion 22 of the third internal electrode 13 and the lead-out portion 29 of the sixth internal electrode 16 are connected to each other through a first external connection conductor 6A. The lead-out portion 24 of the fourth internal electrode 14 and the lead-out portion 27 of the fifth internal electrode 15 are connected to each other through a second external connection conductor 6B. As a result, as shown in FIG. 9A, a first capacitor portion 10A, a third capacitor portion 10C, and a second capacitor portion 10B are formed in order from the negative side to the positive side in the X-axis direction. A gap portion 25A is formed between the first capacitor portion 10A and the third capacitor portion 10C. A gap portion 25B is formed between the third capacitor portion 10C and the second capacitor portion 10B.

As described above, in the electronic component 300, the first internal electrode 11 connected to the first terminal electrode 3 faces the third internal electrode 13, the second internal electrode 12 connected to the second terminal electrode 4 faces the fourth internal electrode 14, and the fifth internal electrode 15 faces the sixth internal electrode 16. Here, the third internal electrode 13 and the sixth internal electrode 16 are electrically connected to each other through the first external connection conductor 6A formed on at least the first side surface 2e and the second side surface 2f. In addition, the fourth internal electrode 14 and the fifth internal electrode 15 are electrically connected to each other through the second external connection conductor 6B formed on at least the first side surface 2e and the second side surface 2f. With such a configuration, the first capacitor portion 10A formed by the first internal electrode 11 and the third internal electrode 13, the third capacitor portion 10C formed by the fifth internal electrode 15 and the sixth internal electrode 16, and the second capacitor portion 10B formed by the second internal electrode 12 and the fourth internal electrode 14 are connected in series to each other through the first external connection conductor 6A and the second external connection conductor 6B. Therefore, it is possible to improve the reliability. In addition, the first internal electrode 11 does not face the second internal electrode 12, the fourth internal electrode 14, the fifth internal electrode 15, and the sixth internal electrode 16. The second internal electrode 12 does not face the first internal electrode 11, the third internal electrode 13, the fifth internal electrode 15, and the sixth internal electrode 16. The fifth internal electrode 15 does not face the first internal electrode 11, the second internal electrode 12, the third internal electrode 13, and the fourth internal electrode 14. That is, between one capacitor portion and the other capacitor portion adjacent to each other, there is no connection portion for connecting their internal electrodes to each other. For this reason, it is possible to suppress the occurrence of a situation in which a crack generated in one capacitor portion reaches the other capacitor portion along the connection portion. As a result, it is possible to suppress the occurrence of a situation in which the crack reaches both the capacitor portions adjacent to each other to cause short-circuiting. As described above, it is possible to improve the performance of an electronic component having a plurality of capacitor portions connected in series to each other.

The shape of the element body 2 is not limited to a rectangular parallelepiped shape as long as the shape has a pair of main surfaces facing each other and side surfaces extending between the main surfaces.

[Form 1]
An electronic component, including:
an element body having a first main surface and a second main surface facing each other in a first direction, a first end surface and a second end surface facing each other in a second direction perpendicular to the first direction, and a first side surface and a second side surface facing each other in a third direction perpendicular to the first and second directions;
a first terminal electrode formed on the first end surface;
a second terminal electrode formed on the second end surface;
a first internal electrode provided in the element body and connected to the first terminal electrode at the first end surface;
a second internal electrode provided in the element body and connected to the second terminal electrode at the second end surface;
a third internal electrode provided in the element body and drawn out to the first side surface; and
a fourth internal electrode provided in the element body and drawn out to the second side surface,
wherein the third internal electrode and the fourth internal electrode are electrically connected to each other through an external connection conductor formed on at least the first side surface and the second side surface,
in the first direction, the first internal electrode faces the third internal electrode without facing the second internal electrode and the fourth internal electrode, and
in the first direction, the second internal electrode faces the fourth internal electrode without facing the first internal electrode and the third internal electrode.

[Form 2]
The electronic component according to form 1,
wherein the first internal electrode and the second internal electrode are arranged in outermost layers of stacked internal electrodes.

[Form 3]
The electronic component according to form 1 or 2,
wherein the element body has a gap portion in which no internal electrode is formed when viewed from the first direction.

[Form 4]
The electronic component according to form 2,
wherein a width of the gap portion in the second direction is equal to or greater than an interlayer thickness of the element body.

[Form 5]
The electronic component according to any one of forms 1 to 4,
wherein the external connection conductor extends to the first side surface, the second side surface, and the first main surface, and
on the second main surface, one end and the other end of the external connection conductor are spaced apart from each other in the third direction.

[Form 6]
The electronic component according to any one of forms 1 to 5,
wherein the external connection conductor is arranged so as not to overlap the first internal electrode and the second internal electrode when viewed from the first direction.

[Form 7]
The electronic component according to any one of forms 1 to 6,
wherein the first terminal electrode and the second terminal electrode include a conductive resin layer.

[Form 8]
An electronic component, including:
an element body having a first main surface and a second main surface facing each other in a first direction, a first end surface and a second end surface facing each other in a second direction perpendicular to the first direction, and a first side surface and a second side surface facing in a third direction perpendicular to the first and second directions;

a first terminal electrode formed on the first end surface;
a second terminal electrode formed on the second end surface;
a first internal electrode provided in the element body and connected to the first terminal electrode at the first end surface;
a second internal electrode provided in the element body and connected to the second terminal electrode at the second end surface;
a third internal electrode provided in the element body and drawn out to the first side surface;
a fourth internal electrode provided in the element body and drawn out to the second side surface;
a fifth internal electrode provided in the element body, arranged between the first internal electrode and the second internal electrode in the second direction, and drawn out to the first side surface; and
a sixth internal electrode provided in the element body, arranged between the third internal electrode and the fourth internal electrode in the second direction, and drawn out to the second side surface,
wherein the third internal electrode and the sixth internal electrode are electrically connected to each other through a first external connection conductor formed on at least the first side surface and the second side surface,
the fourth internal electrode and the fifth internal electrode are electrically connected to each other through a second external connection conductor formed on at least the first side surface and the second side surface,
in the first direction, the first internal electrode faces the third internal electrode without facing the second internal electrode, the fourth internal electrode, the fifth internal electrode, and the sixth internal electrode,
in the first direction, the second internal electrode faces the fourth internal electrode without facing the first internal electrode, the third internal electrode, the fifth internal electrode, and the sixth internal electrode, and
in the first direction, the fifth internal electrode faces the sixth internal electrode without facing the first internal electrode, the second internal electrode, the third internal electrode, and the fourth internal electrode.

REFERENCE SIGNS LIST

2: element body, 2a: first main surface, 2b: second main surface, 2c: first end surface, 2d: second end surface, 2e: first side surface, 2f: second side surface, 3: first terminal electrode, 4: second terminal electrode, 6: external connection conductor, 6A: first external connection conductor, 6B: second external connection conductor, 11: first internal electrode, 12: second internal electrode, 13: third internal electrode, 14: fourth internal electrode, 15: fifth internal electrode, 16: sixth internal electrode, 100, 300: electronic component.

What is claimed is:

1. An electronic component, comprising:
an element body having a first main surface and a second main surface facing each other in a first direction, a first end surface and a second end surface facing each other in a second direction perpendicular to the first direction, and a first side surface and a second side surface facing each other in a third direction perpendicular to the first and second directions;
a first terminal electrode formed on the first end surface;
a second terminal electrode formed on the second end surface;
a first internal electrode provided in the element body and connected to the first terminal electrode at the first end surface;
a second internal electrode provided in the element body and connected to the second terminal electrode at the second end surface;
a third internal electrode provided in the element body and drawn out to the first side surface; and
a fourth internal electrode provided in the element body and drawn out to the second side surface,
wherein the third internal electrode and the fourth internal electrode are electrically connected to each other through an external connection conductor formed on at least the first side surface and the second side surface,
in the first direction, the first internal electrode faces the third internal electrode without facing the second internal electrode and the fourth internal electrode, and
in the first direction, the second internal electrode faces the fourth internal electrode without facing the first internal electrode and the third internal electrode.

2. The electronic component according to claim 1, wherein the first internal electrode and the second internal electrode are arranged in outermost layers of stacked internal electrodes.

3. The electronic component according to claim 1, wherein the element body has a gap portion in which no internal electrode is formed when viewed from the first direction.

4. The electronic component according to claim 3, wherein a width of the gap portion in the second direction is equal to or greater than an interlayer thickness of the element body.

5. The electronic component according to claim 1, wherein the external connection conductor extends to the first side surface, the second side surface, and the first main surface, and
on the second main surface, one end and the other end of the external connection conductor are spaced apart from each other in the third direction.

6. The electronic component according to claim 1, wherein the external connection conductor is arranged so as not to overlap the first internal electrode and the second internal electrode when viewed from the first direction.

7. The electronic component according to claim 1, wherein the first terminal electrode and the second terminal electrode include a conductive resin layer.

8. An electronic component, comprising:
an element body having a first main surface and a second main surface facing each other in a first direction, a first end surface and a second end surface facing each other in a second direction perpendicular to the first direction, and a first side surface and a second side surface facing in a third direction perpendicular to the first and second directions;
a first terminal electrode formed on the first end surface;
a second terminal electrode formed on the second end surface;
a first internal electrode provided in the element body and connected to the first terminal electrode at the first end surface;
a second internal electrode provided in the element body and connected to the second terminal electrode at the second end surface;
a third internal electrode provided in the element body and drawn out to the first side surface;

a fourth internal electrode provided in the element body and drawn out to the second side surface;

a fifth internal electrode provided in the element body, arranged between the first internal electrode and the second internal electrode in the second direction, and drawn out to the first side surface; and a sixth internal electrode provided in the element body, arranged between the third internal electrode and the fourth internal electrode in the second direction, and drawn out to the second side surface, wherein the third internal electrode and the sixth internal electrode are electrically connected to each other through a first external connection conductor formed on at least the first side surface and the second side surface, the fourth internal electrode and the fifth internal electrode are electrically connected to each other through a second external connection conductor formed on at least the first side surface and the second side surface, in the first direction, the first internal electrode faces the third internal electrode without facing the second internal electrode, the fourth internal electrode, the fifth internal electrode, and the sixth internal electrode, in the first direction, the second internal electrode faces the fourth internal electrode without facing the first internal electrode, the third internal electrode, the fifth internal electrode, and the sixth internal electrode, and in the first direction, the fifth internal electrode faces the sixth internal electrode without facing the first internal electrode, the second internal electrode, the third internal electrode, and the fourth internal electrode.

* * * * *